UNITED STATES PATENT OFFICE.

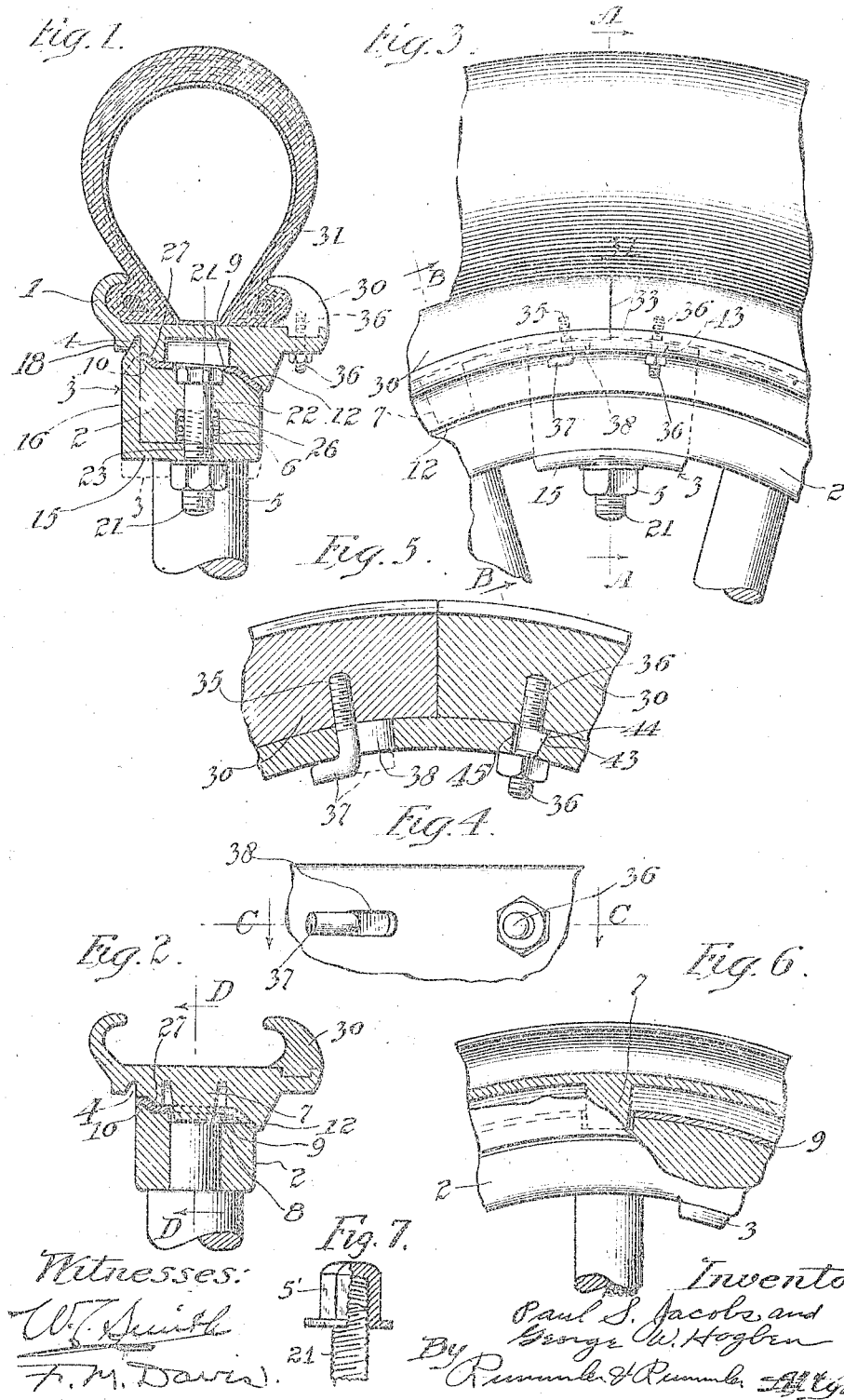

PAUL S. JACOBS, OF ATLANTIC MINE, AND GEORGE W. HOGBEN, OF HOUGHTON, MICHIGAN.

VEHICLE-WHEEL.

1,264,398.

Specification of Letters Patent.

Patented Apr. 30, 1918.

Application filed October 2, 1916. Serial No. 123,331.

*To all whom it may concern:*

Be it known that we, PAUL S. JACOBS and GEORGE W. HOGBEN, citizens of the United States of America, and residents, respectively, of Atlantic Mine and Houghton, in the county of Houghton and State of Michigan, have invented certain new and useful Improvements in Vehicle-Wheels, of which the following is a specification.

The main objects of this invention are to provide an improved form of means for mounting the rim of a vehicle wheel demountably on the wheel-body to provide fastening means of improved form for securing the rim in place against lateral displacement and adapted for loosening conveniently when the rim is to be removed to provide an improved form of means to prevent creeping or peripheral slippage of the rim with respect to the felly when the wheel is in use; and to provide an improved form of clencher ring fastening adapted for quick and reliable setting to firmly grip the tire.

An illustrative embodiment of this invention is shown in the accompanying drawings, in which—

Figure 1 is a cross section on the line A—A of Fig. 3.

Fig. 2 is a cross section on the line B—B of Fig. 3.

Fig. 3 is a fragmentary side view of a wheel, showing a part of the felly, spokes, tire and rim.

Fig. 4 shows clencher ring fastenings.

Fig. 5 is a fragmentary section at C—C on Fig. 4.

Fig. 6 is a fragmentary section at D—D on Fig. 2.

Fig. 7 shows the use of a cap nut instead of a plain nut on the rim fastener.

In the embodiment shown in the drawings, the continuous rim 1 has a wedging fit with the wheel body and is held firmly in engagement with the felly band which is tightly set permanently upon and constitutes substantially a part of the felly 2, said rim being held by means of a series of clamps 3, which are mounted on the felly and wedgingly engage an annular groove 4 in said rim. Each clamp is held in its effective or engaging position by means of a nut 5. A yielding member or spring 6 urges each clamp out of engagement when the nut is released and so holds it until the nut is restored. Means are provided to prevent circumferential slippage of the rim on the felly, said means comprising coacting shoulders and apertures arranged in registry, one or more inwardly projecting shoulders 7 being provided medially on the inner side of the rim 1 and corresponding transverse slots 8 being provided in the corresponding outwardly facing part of the felly. The coacting faces of said rim 1 and wheel-body each includes a medial nearly cylindrical part 9 and a frusto-conical or conoidal part on each side, the latter parts being inclined or pointed in the same direction and being of like angularity with respect to the axis of the wheel and the part 9 being inclined in the same direction but to a far less degree. The three distinct surface parts referred to on the inner face of the rim 1 are normally in radial alinement or registry with the corresponding adjacent surface parts of the wheel-body. One of said mainly inclined parts constitutes an outwardly disposed flange 10 and the other a beveled edge 12. The clamp or fastening member 3 includes a part 15 disposed crosswise of the felly and adapted to fit against its inner face, and an outwardly or radially projecting part 16 disposed against one side of the felly adjacent to the flange part 10 and extending beyond the edge thereof to engage the rim, the latter being apertured at 4, as above stated, to receive the beveled tip 18 of the clamp part 16, the coacting parts of said rim and clamp being correspondingly inclined or wedge-shaped to urge the rim tightly against its seat on the wheel-body when the clamp is forced outward to its effective position. The aperture 4 is preferably in the form of a continuous peripheral groove having a beveled or inclined outer side. In order to fasten said clamp and to set the same adjustably with respect to its engagement with the rim, a bolt or screw member 21 is provided, preferably including a threaded rod having its body and head part fixed in the felly aperture or hole 22, with its threaded end projecting toward the center of the wheel. Said clamp is perforated at 23 to receive said bolt, and the nut 5 fits thereon and may be adjusted manually for setting the clamp. The helical spring 6 is arranged in compression in the socket 26 or enlarged inner end of the bolt hole 22 in the felly.

A wear plate or felly band 27 of relatively hard material, preferably steel, is fixed on the felly, and is substantially unitary therewith, said plate being formed to correspond with the coacting rim member 1. Said felly 2 and band 27 thus constitute a rigid and durable wheel part whereon the rim 1 is demountably secured. The hub, spokes, and such other parts of the wheel-body as are not specifically referred to may be of any suitable form such as may be selected from the prior art.

The clencher locking ring 30 for holding the tire 31 is broken or split at 33 and the ends are provided with fastenings 35 and 36 respectively, the former of which includes a rigidly mounted hook or L-bolt having a shank or body set in said ring, and a head 37 turned back away from the end and adapted to enter the aperture or slot 38 in the rim 1 and to engage said rim to prevent withdrawal. The fastening 36 on the other end of the clencher ring is in the form of a bolt or screw, the body or shaft of which is fixed in said ring, and the projecting part of said bolt is provided with an inclined part or wedging shoulder 43 formed to coact with the correspondingly inclined or beveled edge 44 of the slot 45 formed in the rim adjacent to the slot 38. In order to attach the clencher ring the head of the hook member 35 is inserted in the slot 38 where it acts as a hook to anchor the ring. The ring is then fitted in place against the tire and rim, and the screw 36 thrust into the opening 45, whereupon the nut is applied and set tightly, thereby throwing the wedging shoulder 43 down across the inclined edge 44 of the rim and so locking the ring tightly in place.

Whenever it is desired to remove the rim from the wheel-body the operator by applying a suitable wrench backs away the nuts 5 on the bolts 21 and the springs 6 accordingly throw the clamps 3 back out of engagement with the rim 1, leaving the latter free for removal sidewise. The rim is replaced by reversing the operation. The ends of the bolts 21 are to advantage formed to prevent complete removal of the nuts 5 and loss of the latter is prevented. A rim may thus be taken off without complete removal or possible loss of any clamp, screw, nut or other part.

Although but one specific embodiment of this invention is herein shown and described, it is to be understood that numerous details of the construction shown may be altered or omitted without departing from the spirit of this invention as defined by the following claims.

We claim:

1. A wheel comprising a body and a demountable rim having mutually conoidal bearing faces for wedging engagement whereby the rim may be put on and off by movement longitudinally of the wheel axis, and a plurality of clamps suitably spaced apart on said body for forcing said rim tightly upon said body and releasably securing same, said clamps each comprising a radially disposed wedging member having a transversely disposed apertured part and a screw member coacting with said apertured part and arranged for forcing said wedging member outward, said rim and wedging member being formed for wedging engagement oppositely from that between said body and rim.

2. In a wheel having a demountable rim a clamp adapted for urging the rim into place and for securing same, said clamp comprising an angle member having arms at about right angles, and a radially disposed bolt and nut device for controlling same, one of said arms being disposed across the inner side of the wheel-body for coaction with said bolt and nut device and the other extending radially for coaction with the rim, the two latter members being correspondingly beveled for wedging action, and the first mentioned arm having radial engagement with said bolt and nut device whereby the clamp may be forcibly set to lock the rim in place.

3. A wheel, comprising a wheel-body in combination with a demountable rim having rigid wedging engagement therewith when assembled, locking means for urging the parts together lengthwise of the axis and adapted for securing same against separating, and centrally disposed stop means adapted and arranged to prevent any relative peripheral movement of the wheel-body and rim, said wheel-body and rim each having in registry respectively a substantially cylindrical medial part and lateral conoidal wedging surfaces pointing or inclined at like angles in the same direction, said wheel-body and rim being correspondingly provided, one with a transverse open-ended aperture or slot extending into and across the cylindrical part and the other with a shoulder adapted to enter said slot at its open end in assembling said parts and comprised by said stop means, and said rim and locking means having radially operable wedging engagement.

4. A wheel-body having a rim formed to fit wedgingly thereon, and rim securing means therefor including a radially operable wedging clamp adapted for drawing on and securing said rim demountably, said wheel-body having a bolt set radially therein with its head fixed non-turnably and with its threaded end pointing inward toward the wheel axis and a nut on said bolt, said clamp comprising an angular member having one arm perforated to receive said bolt, and the other arm being suitably beveled to coact wedgingly with said rim, and a spring urging said clamp inward.

5. A wheel, comprising a body and a rim having coacting faces of conoidal wedging shape, and securing means for said body and rim, said rim having a ledge overlapping said body on the side having the greater diameter, the inner face of the overlapping part being apertured to receive a lock, said securing means including an angular lock piece having an outwardly disposed arm beveled at its tip to coact with the rim aperture, and said lock piece having an arm disposed inward from the outer face of said body and extending across and against the outer part of the wheel-body in a direction parallel to the wheel-axis, and screw means coacting with the latter mentioned arm and said body for driving said lock outward to its effective position.

Signed at Houghton this 28th day of Sept., 1916.

PAUL S. JACOBS,
GEORGE W. HOGBEN.